Jan. 30, 1968　　　L. J. KINKEL ET AL　　　3,366,877
SPECTRUM ANALYZER
Filed April 29, 1963
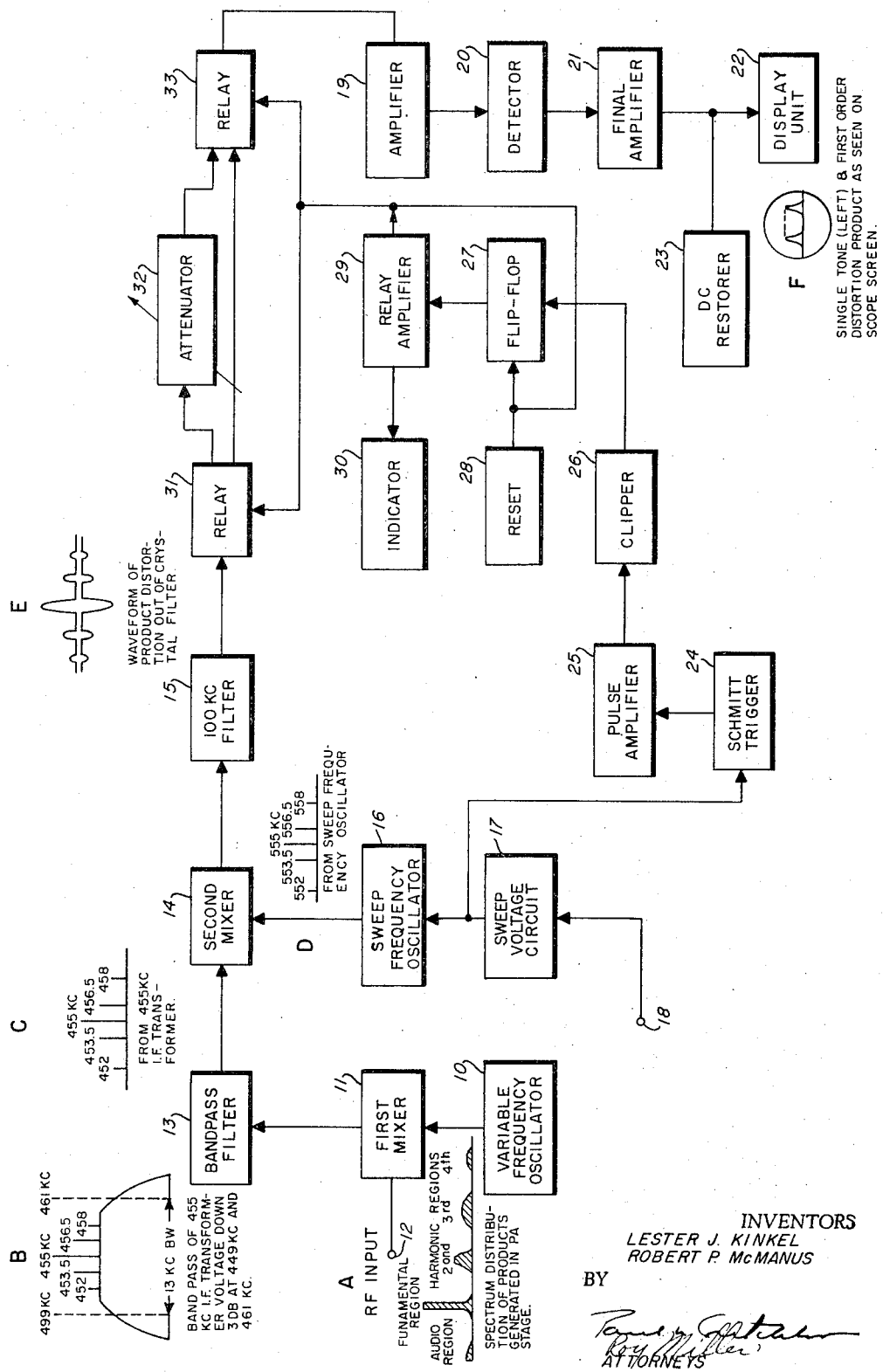
INVENTORS
LESTER J. KINKEL
ROBERT P. McMANUS
BY
ATTORNEYS

United States Patent Office 3,366,877
Patented Jan. 30, 1968

3,366,877
SPECTRUM ANALYZER
Lester J. Kinkel and Robert P. McManus, San Diego, Calif., assignors to the United States of America as represented by the Secretary of the Navy
Filed Apr. 29, 1963, Ser. No. 276,665
4 Claims. (Cl. 324—77)

The invention described herein may be manufactured and used by or for the Government of the United States of America for governmental purposes without the payment of any royalties thereon or therefor.

The present invention relates to a frequency spectrum analyzer and more particularly, to a frequency spectrum analyzer for measuring distortion products and specifically, to a system for providing visual display of distortion products of different amplitudes as waveforms of the same amplitude.

The present invention arose as a result of an investigation into existing distortion measurement systems. Such systems are exemplified by the patents to: V. W. Wall, Patent No. 2,782,366: C. G. Sontheimer, Patent No. 2,432,214: H. Hurvitz, Patent No. 3,032,712: and H. Hurvitz, Patent No. 2,929,989. The patents listed above illustrate various means for checking the frequency response of systems under test and the Wall patent provides a visual display of the harmonic distortion products. However, the prior art systems as exemplified by the above cited references ordinarily utilize the system under test as an integral component of the checking-out system itself.

There exists a need for accurate, miniaturized low cost test equipment for use with mobile equipment. At the same time it is desired that two distortion products of different amplitudes be displayed as waveforms of the same amplitude. It is also desirable that a unit be constructed which utilizes non-critical parts and therefore would not require a critical tuning or critical alignment.

An object of the present invention is to provide a low cost non-critically tuned, improved spectrum analyzer.

An additional object of the present invention is to provide a spectrum analyzer for individual display of two distortion products of different amplitudes as waveforms of the same amplitude on a display unit.

Another object of the present invention is to provide an improved spectrum analyzer employing non-critical circuitry thereby obviating the need for critical tuning and reducing field maintenance.

A further object of the present invention is to provide a spectrum analyzer which is readily adaptable for use with any oscilloscope and is a self contained compact unit.

An additional object of the present invention is to provide a spectrum analyzer wherein a visual display of distortion products of different amplitudes is provided and the difference in amplitude of the distortion products may be read off directly.

Various other objects and advantages will appear from the following description of one embodiment of the invention, and the novel features will be particularly pointed out hereinafter in connection with the appended claims.

In the embodiment set forth in the accompanying drawing a variable frequency oscillator 10 is provided whose output comprises one of two inputs into a first mixer 11. Another input to the first mixer 11 comprises an RF input received at terminal 12 which is heterodyned with the output of the variable frequency oscillator and then introduced into a 455 kilocycle bandpass filter 13. The output of filter 13 is then introduced as one of the two inputs to a second mixer 14 the output of which is coupled to a 100 kc. filter 15.

The second input to the second mixer comprises the output of a swept frequency oscillator 16 which receives an initiating or timing voltage from a sweep voltage circuit 17 which in turn is actuated by a timing input from an input terminal 18.

The ouput of the 100 kc. crystal filter 15 is connected to a switching circuit comprising two single-pole-double-throw relays 31 and 33. One output of the relay 31 is coupled as the input to a 0–60 db attenuator 32 and the other output from the relay 31 is coupled directly to the single-pole-double-throw relay 33. The other input relay to the relay 33 comprises the output of attenuator 32.

The output from the relay 33 is then coupled to a 100 kc. amplifier 19 and from there to an envelope detector 20, and through a final amplifier 21 to the vertical input, not shown, of a display unit 22 operative to produce a sweep time base display as shown at F. A DC restorer 23 is provided whose output is coupled in at the output of the final amplifier 21 for DC restoration.

The timing input at 18 is also coupled into a Schmitt trigger 24 whose output is coupled through a pulse amplifier 25 and a clipper 26 and forms one input to a flip-flop 27.

The rest input to flip-flop 27 comprises the output of reset circuit 28 and the output from a relay amplifier 29. The input to relay amplifier comprises the output of flip-flop 27 when flip-flop 27 is set to "one." The output of the relay amplifier 29 is also coupled to both the relay 31 and relay 33 and constitutes the energizing voltage for the relay coils, not shown.

In addition, an indicator is provided so that one may observe when the attentuator is in operation i.e. when the distortion product is being attenuated through the use of an indicator 30 which receives its driving voltage as an output from the relay amplifier 29.

In order to give a more graphic illustration of the waveforms that occur at various points in the spectrum analyzer various waveforms and frequency response spectrums are illustrated at points in the analyzer. For instance, A represents the spectrum distribution of products generated in a typical power amplifier stage i.e. these would represent the waveforms coupled in at terminal 12. B represents the bandpass of the 455 kc. filter which is actually an IF transformer in this case.

C shows the frequencies present at the output of the 455 kc. IF filter while the frequency spectrum at D illustrates the output from the swept frequency oscillator. As one can see from comparing the two points C and D, the difference frequency is a constant 100 kilocycles.

The waveform at E represents the waveform of the distortion product out of the 100 kc. crystal filter 15 while F represents the waveforms that might be seen on a sweep time base visual display unit such as an oscilloscope, for instance. In this instance a single tone on the left side and the first order distortion product on the right side is illustrated as a typical example.

Operation

In most instances the principal causes of distortion are non-linearities of the amplifier tube plate current characteristic and grid current loading. In order to confine distortion generation to the last stage or two in a linear power amplifier, all previous stages are operated class A.

The generation of distortion products due to the non-linear characteristics of the amplifier tube can be derived from the transfer characteristics of the tube, also called the dynamic characteristic. The shape of this curve and the choice of the zero signal operating point determine the distortion which will be produced by the tube.

One might attempt to filter out distortion products by using narrow-band filters. However, because the complexity of designing a narrow-band filter increases in proportion to an increase in frequency, the heterodyne principle is employed in the present circuitry of the spectrum analyzer. This allows use of a narrow-band filter at some frequency below that of the input signal.

In order to provide heterodyning, the variable frequency oscillator 10 is employed to provide a difference frequency of 455 kilocycles below or above the input frequency coupled in at 12. The output from the first mixer stage 11 is coupled to the primary of a selective 455 kilocycle transformer 13 which in this case is used as a narrow-band filter having a 13 kilocycle bandpass to insure passage of the various spectral components without relative amplitude attenuation. The bandpass of the filter is shown at B as noted previously. The output from the 455 kilocycle filter 13 is then heterodyned to 100 kilocycles in the second mixer stage 14 through the use of the swept frequency oscillator 16. A 100 kilocycle crystal lattice 50 cycle bandwidth filter 15 couples the 100 kilocycle frequencies into a switching circuit consisting of the relays 31 and 33.

The switching circuit consists of two single-pole-double-throw relays that close simultaneously when the relay amplifier tube 29 starts conducting. The switching paths may be followed in the drawing. The relay amplifier 29 conductcs when a delayed trigger pulse is applied to its grid, not shown. The delayed trigger, adjustable in time, starts the relay amplifier 29 conducting just before the carrier signal enters the switching circuit. The carrier in this way goes through the attenuator and its ampltiude is reduced to that of the distortion product being analyzed. With the relays 31 and 33 open, the distortion products have a path of direct transmission through the switching circuit into the tuned amplifier stage 19. After switching, the composite signal is raised to an appropriate output level by the amplifiers 19 and 21. In addition, the output of the 100 kilocycle amplifier 19 is modified by an envelope detector which allows only the positive half of the envelope to enter the amplifier stage 21. A DC restorer 23 at the output of the final amplifier stage eliminates any portion of the waveform that may be negative due to the discharge of coupling capacitors, not shown, in the circuitry. The output from the final amplifier 21 is then coupled to the vertical deflection circuit of the oscilloscope for visual presentation of the waveform.

Both mixer stages are used as product mixers. The distinguishing characteristic of a product mixer is that it is a device in which the transfer function of each input signal, considered independently, is linear. When a radio frequency signal is applied to the control grid and a local oscillator signal applied to the suppressor grid, the difference frequency component of plate current is selected by the 455 kilocycle filter 13. Using a product mixer results in greater isolation between the mixer and its input signals a than does use of a square law method of detection.

Triggering of the relay amplifier 29 is accomplished by utilizing a Schmitt trigger circuit 24. Delaying action of this trigger is achieved by changing the bias level of the Schmitt circuit to a value equaling that of the sweep voltage during one instant of a sweep cycle. Thus, as the sweep voltage becomes greater than the bias level the Schmitt circuit fires, applying a positive pulse to the grid of the pulse amplifier tube of the pulse amplifier 25. Twin decoupling diodes, not shown, are used to reject any positive part of the amplified pulse from the clipper 26 which are inserted upon plates of the bistable flip-flop 27 to eliminate the chance of notched pulse output. The circuit utilized in the flip-flop 27 is biased below cut-off and will immediately start conducting, biasing the other portion below cut-off. If the plate of the cut-off tube, not shown, is connected to the grid of the relay amplifier 29 the rise in voltage will start the relay amplifier conducting, closing the switching relays 31 and 33. The positive gate pulse connected from the output of the relay amplifier 29 to the reset input of the flip-flop 27 will reverse the position of the flip-flop circuit at the end of the sweep, stopping the conduction of the relay amplifier 29 and opening the relays 31 and 33. The flip-flop circuit 27 can be positioned either way initially by initiating the reset circuitry 28.

The attenuator 32 incorporates four separate sections used in various combinations. "L" sections, having an output voltage X equivalent to the desired attenuation in decibels are used. The desired decibels attenuation for any section is caluated from the equation 20 log $X$. Series combinations of the different sections would add the decibel attenuation at 10 decibels per step to a total of 60 decibels attenuation. "L" section attenuators will be accurate if the input to any one section has a much lower impedance than the section itself. This will then simulate a constant current generator supplying a high impedance load. If the impedance of any section approaches the value of the source impedance supplying it the output voltage X will be lower than the value the section was designed for.

In operation the spectrum analyzer performs successfully and proves to be a highly accurate means of measuring the intermodulation distortion in a single sideband system and features economy in construction along with portability. The unit comprises a self-contained portable piece of equipment that can be used with any display unit for a visual presentation of the distortion products of a unit under test.

Obviously many modifications and variations of the present invention are possible in the light of the above teachings. It is therefore to be understood that within the scope of the appended claims the invention may be practiced otherwise than as specifically described.

What is claimed is:
1. A frequency spectrum analyzer comprising:
   an input mixer circuit connected to receive an input signal;
   a variable frequency signal source connected to said input mixer circuit and adapted to generate a selectively variable frequency for producing difference frequency output signals from said input mixer having a desired fundamental frequency and harmonics thereof within a determinable bandwidth;
   a second mixer circuit connected to receive said fundamental frequency and harmonic signals;
   a sweep voltage generator connected to receive a timing signal for generating a trigger signal of varying amplitude;
   a sweep frequency oscillator connected to said second mixer and operatively responsive to said trigger signal for generating a repetitive output varying in frequency substantially as the frequency variation between the limits of said determinable bandwidth for producing outputs from said second mixer of substantially one determinable frequency and displaced in time in accordance with respective frequency displacement of said harmonics relative to said fundamental frequency;
   an attenuating means;
   a by-pass signal path connected for by-passing said attenuating means;
   a switching circuit synchronously operative relative to said repetitive output of said sweep frequency oscillator and connected to receive the outputs of said second mixer for selectively connecting said outputs through said attenuating means or through said by-pass signal path responsive to said input trigger signal, said switching circuit being actuated by a trigger circuit variably responsive to the amplitude of said trigger signal for selectively varying the delay of its operation; and indicating means connected to receive the outputs of said switching circuit and adapted to display the relative amplitudes of frequency components within said determinable bandwidth.

2. A frequency spectrum analyzer as claimed in claim 1 wherein said switching circuit is adapted to selectively cause the attenuation of certain of the outputs of said second mixer.

3. A frequency spectrum analyzer as claimed in claim 1 wherein said switching circuit has a selectively variable threshold of operation.

4. A frequency spectrum analyzer as claimed in claim 1 and including an envelope detector connected between said switching circuit and said indicating means for passing only one polarity of the envelope of the waveform of said frequency components.

References Cited

UNITED STATES PATENTS

| | | | |
|---|---|---|---|
| 2,767,374 | 10/1956 | Slonczewski | 324—57 |
| 2,973,478 | 2/1961 | Hurvitz | 324—77 |
| 2,996,667 | 8/1961 | Galbreath | 324—77 |
| 3,032,712 | 5/1962 | Hurvitz | 324—77 X |
| 3,156,867 | 11/1964 | Whitwell et al. | 324—79 X |
| 3,182,254 | 5/1965 | Feldman et al. | 324—77 X |
| 3,196,348 | 7/1965 | Parker | 324—77 X |
| 3,210,656 | 10/1965 | Lent | 324—57 |

RUDOLPH V. ROLINEC, *Primary Examiner.*

WALTER L. CARLSON, ARCHIE R. BORCHELT,
*Examiners.*

A. E. RICHMOND, P. F. WILLE, *Assistant Examiners.*